United States Patent

Wilson et al.

[15] 3,687,501
[45] Aug. 29, 1972

[54] NON-ROTATABLE FASTENER

[72] Inventors: Charles A. Wilson, Rte. 1, Box 355, Williamstown, N.J. 08094; Joseph P. Villo, 1432 Autumn Road, Jenkintown, Pa. 19046

[22] Filed: Dec. 31, 1969

[21] Appl. No.: 889,546

[52] U.S. Cl. ..................287/189.36 F, 151/41.73
[51] Int. Cl. .........................................F16b 5/02
[58] Field of Search .....151/68, 41.73, 22; 85/48, 46, 85/47, 19, 21; 287/189.36 F

[56] References Cited

UNITED STATES PATENTS

| | | | |
|---|---|---|---|
| 1,932,358 | 10/1933 | Thomson | 85/21 |
| 1,972,119 | 4/1934 | Wernhardt | 85/21 |
| 2,024,071 | 12/1935 | Taylor et al. | 85/21 |
| 2,613,570 | 10/1952 | Sokolik | 85/21 |
| 430,236 | 6/1890 | Rogers | 85/48 |
| 3,455,198 | 7/1969 | Barrett | 85/47 |
| 3,443,617 | 5/1969 | Whiteside et al. | 151/41.73 |
| 1,227,627 | 5/1917 | Kennedy | 151/41.73 |

FOREIGN PATENTS OR APPLICATIONS 500,583  3/1954  Canada..................151/41.73

Primary Examiner—Edward C. Allen
Attorney—Andrew L. Ney

[57] ABSTRACT

A rotation resistant fastener for use in securing a plurality of members together includes a generally smooth shank portion having a plurality of radially projecting lobes extending lengthwise along the shank portion. Each lobe is arcuate throughout substantially its entire arc length and includes a high point of maximum radial projection located between a pair of low points of minimum radial projection. At one lengthwise end of each lobe there is an additional radial protrusion or bump that follows the contour of the lobe except that it projects further in a radial direction. In use, the fastener is inserted into aligned apertures in the members to be joined so that the radial bump urges the material around the apertures forwardly along the length of the hole and outwardly around the hole. The displaced material thereafter springs back toward its original position and packs around the lobes on the shank.

5 Claims, 4 Drawing Figures

PATENTED AUG 29 1972

3,687,501

INVENTORS
JOSEPH P. VILLO &
CHARLES A. WILSON
BY
ATTORNEY

NON-ROTATABLE FASTENER use of mating threaded fasteners to assemble semi-blind joints, i.e., joints that are accessible from both sides when inserting one of the fasteners into aligned apertures in the joint, but which are accessible from only one side when tightening the fasteners to clamp the joint, presents certain problems. For example, when tightening the fasteners, it is necessary to prevent rotation of one fastener relative to the other and due to the inaccessibility of one side of the joint special fasteners and/or tools are required. In addition to finding utility in semi-blind applications, these special fasteners and tools are utilized in various other applications where it is desirable to prevent rotation of one of the fasteners without gripping that fastener with a separate tool. For example, in assembly line operations and construction installations it is usually desirable for the workman to have both hands free to operate the wrenching tool used to clamp the joint.

One type of fastener used in the above described applications includes a bolt with a threaded portion spaced from the head of the bolt by knurled section with sharp edges adapted to cut the surface of the apertures in the members to be joined when inserted therein. While this type of fastener generally prevents rotation of the bolt while the nut is being tightened, it is relatively expensive due to the special operation required to form the knurls. Moreover, the joint is weakened due to the cutting of the surface of the apertures and, the stress concentrations formed by the knurls in the members to be joined. Accordingly, this type of bolt has limited application.

Another type of fastener used in the above described applications includes a bolt having a shank with a smooth surface and a threaded portion. In addition, a broach is provided on the bottom surface of the point end of the shank and is engageable by a mating member on a wrenching tool that also has a drive configuration. When assembling the joint, the wrenching tool is placed in position on the bolt and its associated nut with the mating member engaging the broach on the shank and the drive configuration engaging the nut. When the tool is actuated, the bolt is held stationary and the nut is rotated to clamp the joint. While bolts of this type have generally been satisfactory in preventing relative rotation with the nut, they are relatively expensive due to the extra length of material required in the shank to accommodate the broach and the special operation required to form the broach. Also, because of the special tools required, assembly of the joint is relatively expensive.

An alternative to using knurled or broach type bolts in semi-blind or similar joints is to clinch a nut in one of the members to be joined and thereafter tighten a bolt in the nut to clamp the joint. Since in most applications the bolt is tightened with a high torque, some mechanism should be provided on the nut to prevent rotation of the nut in its associated member. One such mechanism for preventing rotation of the nut includes serrations or teeth formed on the nut that embed in the material of the associated member when the nut is clinched thereto. While nuts formed with serrations or teeth are generally satisfactory in preventing rotation with the member to which the nut is clinched, the serrations or teeth introduce stress concentrations into and weaken the joint. Moreover, due to the special operation required to form the serrations or teeth, these nuts are relatively expensive.

It is an object of this invention, therefore, to provide an inexpensive fastener that is suitable for semi-blind applications.

It is still another object of this invention to provide an inexpensive fastener that will resist rotation when seated in a joint.

It is yet another object of this invention to provide a joint that is relatively inexpensive to assemble when using a rotation resistant fastener.

These and other objects of this invention are accomplished by providing a fastener having a smooth shank portion formed with a plurality of radially projecting lobes extending lengthwise along and arcuately around the shank portion. Substantially the entire arc length of each lobe is arcuate and includes a low point of minimum radial projection at each end and a high point of maximum radial projection intermediate the low points. The smooth shank portion may be tapered and each lobe may further include an additional radial projection or bump that follows the contour of its associated lobe except that it projects further in a radial direction. When the fastener is inserted into aligned apertures in members to be joined, the radial bump forces the material around the aligned apertures forwardly along the axial length of the apertures and outwardly in a radial direction. Thereafter, the material displaced by the radial bump flows back toward its original position and packs around the lobes on the shank. Accordingly, rotation of the bolt is prevented.

For a better understanding of the present invention, together with the objects thereof, reference is made to the following description, taken in conjunction with the accompanying drawing, and its scope will be pointed out in the appended claims.

Referring to the drawings.

A preferred embodiment of a fastener in accordance with this invention is disclosed herein the form of a bolt 10 having an enlarged head 12, a threaded shank portion 14 and a generally smooth shank portion 16 located between the head and the threaded shank portion. Head 12 may be of any suitable configuration and it will be understood from the further description of the preferred embodiment, may be omitted in various types of fasteners. A recess, not shown, is provided in the head and is adapted to be engaged by a suitable wrenching tool in the event it becomes desirable to assemble or disassemble the bolt from a joint by applying a relatively high torque. As will also be clear from the further description of this invention, the bolt can be assembled and disassembled in other ways and the recess may be omitted.

Figure 3:
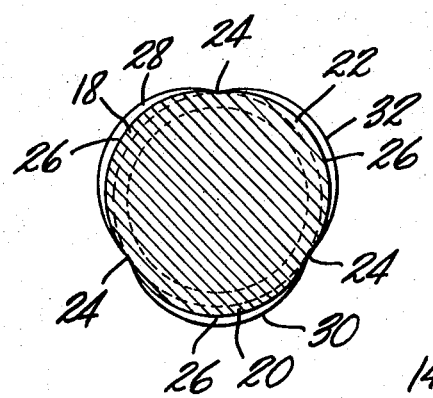
FIG. 3 is a view in section taken along the line 3—3 of FIG. 2.
Figure 1:
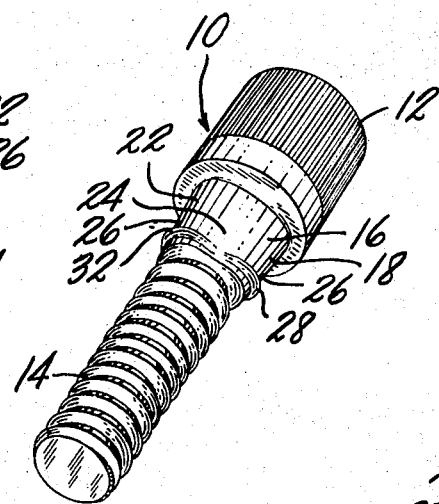
FIG. 1 is a perspective view of a bolt constructed in accordance with the present invention.
Figure 2:
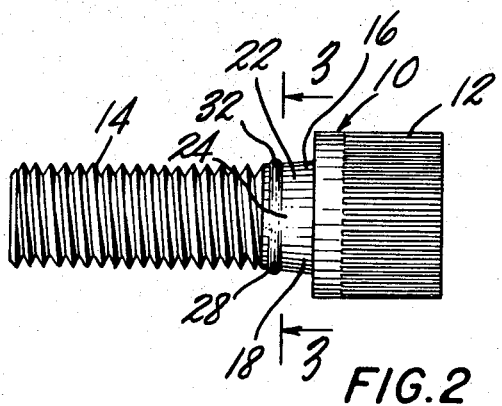
FIG 2 is a plan view of the bolt shown in FIG. 1.

Extending substantially throughout the axial length of smooth shank portion 16 there are a plurality of radially projecting lobes 18, 20 and 22 adapted to cooperate with the members to be joined, to prevent rotation of the bolt. Each of the lobes is arcuate throughout substantially its entire arc length so that each lobe comprises a pair of low points 24, that is, a point of minimum radial projection and a high point 26, that is, a point of maximum radial projection, intermediate the low points. It should be noted that each low point 24 lies on the periphery of an imaginery circle, shown in dotted lines in Figure 3, located through shank portion 16 and as best seen in Figure 3, substantially all of the circumference of this imaginary circle, except for the low points, has a lobular portion projecting therearound.

Located adjacent threaded section 14 on each lobe 18, 20 and 22, there are a plurality of additional radial protrusions or bumps 28, 30 and 32, respectively, which facilitate insertion of the bolt into a joint. These bumps are arcuate throughout substantially their entire arc length and follow the contour of their respective lobes, that is, they originate from the same low points, but project to a greater radial extent than the lobes and accordingly have a different high point. It should also be noted that shank portion 16 is slightly tapered with the greater cross-sectional area being located under the head and the smaller cross-sectional area being located adjacent threaded portion 14. This slight taper also facilitates insertion of the bolt into a joint.

Figure 4:
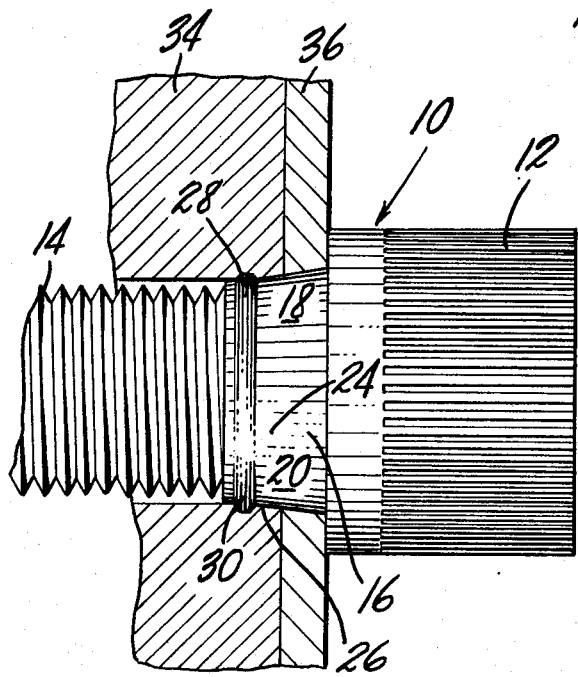
FIG. 4 is a view partly in section illustrating a bolt in accordance with this invention inserted in a pair of panel members.

Referring to Figure 4, bolt 10 is shown seated in aligned, circular apertures in a pair of panel members 34 and 36. The diameter of the aligned apertures in the panels is equal to the diameter of the imaginary circle defined adjacent the threaded portion 14 by the low points of the lobes. Accordingly, bolt 10 must be forced into the aligned apertures and this may be accomplished in one of several ways. For example, an axial driving tool may be utilized to drive bolt 10 completely through the apertures until the bearing surface of head 12 bears on the outer portion of panel 36. Another method of inserting bolt 10 into the aligned apertures comprises driving the bolt part way into the apertures so that a portion of the lobes engage the material around the apertures, placing a nut on the threaded shank portion 14 and thereafter tightening the nut so as to pull the bolt downwardly into the apertures until the bearing surface of head 12 abuts the outer surface of panel 36. The latter method permits hand installation of the bolt. As the bolt is forced into the apertures, radial bumps 28, 30 and 32 engage the material around the apertures and force this material outwardly so as to enlarge the hole and forwardly toward the outer surface of panel 34. When the bolt is seated, as shown in Figure 4, the material displaced by the bumps springs back toward its original position, but will pack around the lobes on shank 16 and especially in the low points 24. Due to the lobular configuration of the shank, rotation of the bolt is prevented while the nut is tightened. In addition, since the lobes engage panel 30 and a portion of panel 32, rotation of the panels relative to one another is prevented, however it should be understood that the lobes need only engage one of the panels, or can engage both panels throughout their entire thickness.

Still another method of inserting bolt 10 into aligned apertures includes the use of a wrenching tool that provides relatively high torque for rotating the bolt, that is, a torque higher than that normally used to install and remove threaded fasteners. With this method of insertion, the material around the aligned apertures is repeatedly displaced and sprung back toward its original position until the rotation of the bolt ceases. At this point, the material around the apertures springs back and packs around the lobes in a manner similar to that described in connection with axially inserted bolts. A primary advantage of this method of installation is that the bolt can be utilized with a tapped hole in a panel and the use of a nut is obviated. The resistance to rotation of the bolt provided by the cooperation of the lobes with the panel material provides a self-locking feature and prevents unintentional loosening of the bolt due to vibrations and other external loads.

To remove the bolt from the joint, an axial driving tool can be utilized to drive the bolt out of the panels. The bolt can be removed from the panels upon the application of a sufficiently high torque, thus providing an alternative method of removing the bolt in the event an axial driving tool cannot be utilized.

At this point, it should be noted that by describing the lobes and bumps as arcuate throughout substantially all of their arc length is meant that at least a major portion of each protrusion is arcuate and any straight line portions are minor. Such a configuration allows the high points of the lobe and bump to be located at points close enough to the circle defined by the low points so that insertion of the bolt into the circular apertures in the panels is facilitated while the desired resistance to rotation is maintained. It should be understood that if the high points of the lobes are located too far from the imaginary circle defined by the low points, an excessive amount of panel material will have to be displaced by the lobes and bumps and insertion of the bolt will be difficult, and in some cases impossible.

As pointed out previously, radial protrusions or bumps 28, 30 and 32 facilitate insertion of the bolt into the apertures in the panels. This results from the fact that the bumps do not extend over the entire axial length of their respective lobes and during insertion of the bolt into the apertures the bumps displace the panel material away from and out of contact with the lobes. By forcing the panel material out of contact with the lobes, the friction between these members is reduced and insertion of the bolt is facilitated. As also pointed out previously, the taper on shank portion 16 facilitates insertion of the bolt into the apertures.

A primary advantage of a fastener in accordance with this invention is that no special operations are required to form the lobular configuration of the smooth shank portion, since this configuration can be provided for in the dies of conventional machinery. Thus, the cost of the fastener is significantly reduced over that of knurled or broach type fasteners.

Various modifications can, of course, be made to the preferred embodiment illustrated in the drawings. For example, the configuration of shank portion 16 can be utilized with nut, studs and other types of fasteners. In addition, the number of lobes and their spacing may be varied in accordance with various design requirements.

It should be clear from the preceeding description that a fastener in accordance with this invention can be easily inserted in a joint so as to resist rotation therein without requiring the formation of special hole that conform to the configuration of the shank portion of the fastener. In addition, since there are no sharp corners or edges on the shank portion of the fastener, no undesirable stress concentrations are induced in the panel and, moreover, since the size of the apertures is increased, a beneficial tensile stress is induced, dependent upon the length of smooth shank portion 16, in one or more of the panel members to be joined which adds to the fatigue strength of the joint. Furthermore, the fastener can be made without special manufacturing operations that add to the cost and/or weight of the fastener. Finally, the joint can be assembled without the use of special tools.

While in the foregoing there has been described a preferred embodiment of the invention, various modifications may become apparent to those skilled in the art to which this invention relates. Accordingly, all such modifications are included within the intended scope of the invention.

What is claimed is:

1. A rotation resistant threaded fastener comprising a shank portion, said shank portion including a threaded segment at one end and a generally smooth portion at the other end of said shank, said generally smooth portion comprising a tapered portion having a plurality of protuberances throughout substantially the entire axial length of said generally smooth portion with each said protuberance being arcuate throughout substantially its entire arc length and including a cross-sectional shape of a high point of maximum radial projection located between a pair of low points of minimum radial projection with said high and low points of radial projection having a progressively increasing radial length along said tapered portion from a minimum for each said minimum and maximum radial projections adjacent said threaded segment of said shank portion to a maximum at the end of said shank portion remote from said threaded segment and a plurality of protrusions of a finite axial length superimposed on said protuberances adjacent the juncture of said threaded segment and said tapered portion with each said protrusion being arcuate throughout substantially its entire arc length to follow the contour of an associated protuberance and projecting radially outwardly further than said associated protuberance at said juncture whereby when said fastener is operatively engaged within aligned apertures to fasten a plurality of workpieces together said protrusions displace material of the workpiece around the aperture in said workpieces forwardly toward said threaded shank portion and outwardly with the displaced material springing back toward its original position to pack about the protuberances on the tapered portion of said shank to resist rotation of the fastener within the workpieces.

2. A fastener unit according to claim 1 wherein the low points of adjacent protuberances are common.

3. A fastener unit according to claim 1 wherein an enlarged head is formed at that end of said shank portion opposite from said threaded portion.

4. A joint comprising a panel member having a hole extending therethrough,
and a rotation resist and threaded fastener tightly seated in said hole in said panel, said fastener comprising a shank portion, said shank portion including a threaded segment at one end and a generally smooth portion comprising a tapered portion having a plurality of protuberances throughout substantially the entire axial length of said generally smooth portion with each said protuberance being arcuate throughout substantially its entire arc length and including a cross-sectional shape of a high point of maximum radial projection located between a pair of low points of minimum radial projection with said high and low points of radial projection having a progressively increasing radial length along said tapered portion from a minimum for each said minimum and maximum radial projections adjacent said threaded segment of said shank portion to a maximum at the end of said shank portion remote from said threaded segment and a plurality of protrusions of a finite axial length superimposed on said protuberances adjacent the juncture of said threaded segment and said tapered portion with each said protrusion being arcuate throughout substantially its entire arc length to follow the contour of an associated protuberance and projecting radially outwardly further than said associated protuberance at said juncture, said fastener operatively engaged within said panel member so that said protrusions displace material of the panel member around the hole in said panel member forwardly toward said threaded shank portion and outwardly with the displaced material springing back toward its original position to pack about the protuberances on the tapered portion of said shank to resist rotation of the fastener within the hole.

5. A joint according to claim 4 including a second panel member adjacent the other panel member and having a hole aligned with said hole in said other panel member, said shank portion of said fastener unit extending into said hole in said second panel member with said protrusions in tightly fitted engagement with said second panel member, said material in said second panel member compressed in the vicinity of said hole in said second panel member as a result of said protrusions having greater cross-sectional dimensions than the size of said hole in said second panel member prior to installation of said fastener unit.

* * * * *